United States Patent
Bahattab

(10) Patent No.: US 6,816,457 B1
(45) Date of Patent: Nov. 9, 2004

(54) PREDICTIVE ROUTING TABLE CACHE POPULATION

(76) Inventor: Abdullah Ali Bahattab, 3100 S. Michigan Ave., Apt. #902, Chicago, IL (US) 60616

( * ) Notice: Subject to any disclaimer, the term of this patent is extended or adjusted under 35 U.S.C. 154(b) by 844 days.

(21) Appl. No.: 09/633,754

(22) Filed: Aug. 7, 2000

Related U.S. Application Data

(60) Provisional application No. 60/208,888, filed on Jun. 2, 2000.

(51) Int. Cl.[7] .............................................. H04L 12/56
(52) U.S. Cl. ...................... 370/232; 370/234
(58) Field of Search .................................. 370/229, 230, 370/230.1, 231, 232, 234, 235, 389, 392, 395.7, 428, 429, 395.2, 395.21

(56) References Cited

U.S. PATENT DOCUMENTS 5,488,608 A * 1/1996 Flammer, III ................ 370/400
6,118,760 A * 9/2000 Zaumen et al. .............. 370/229

\* cited by examiner

Primary Examiner—Alit Patel
Assistant Examiner—William Schultz
(74) Attorney, Agent, or Firm—DeMont & Breyer, LLC

(57) ABSTRACT

A router and method for routing table cache population technique is disclosed. In particular, the illustrative embodiment routes packets through it more quickly than comparatively expensive routers in the prior art. The present invention recognizes that a fast router has small routing table cache that has a high hit ratio and that a high hit ratio can be achieved with a small routing table cache by predicting which entries will be needed in the routing table cache in the future and by populating the routing table cache with those entries before they are needed. The illustrative embodiment of the present invention comprises: an input port for receiving a succession of packets, wherein each of the packets comprises a destination address; a plurality of output ports; a switching fabric for interconnecting the input port to each of the plurality of output ports; a processor or building a temporal model of the occurrence of the destination addresses at the input port, for populating the routing table cache based on the temporal model and at least one entry that is stored in a routing table, and for routing at least one of the packets from the input port to one of the output ports through the switching fabric based on the entry that is stored in the routing table cache.

2 Claims, 5 Drawing Sheets

PREDICTIVE ROUTING TABLE CACHE POPULATION

CROSS-REFERENCE TO RELATED APPLICATIONS

This application claims the benefit of U.S. Provisional Application No. 60/208,888, filed Jun. 2, 2000, which provisional application is incorporated by reference.

FIELD OF THE INVENTION

The present invention relates to telecommunications and computer networks in general, and, more particularly, to the design of a router for use in a packet network.

BACKGROUND OF THE INVENTION

In a packet network, the finite speed of light and the finite speed at which a router can operate precludes the traversal of a packet from one side of the network to another instantaneously. Therefore, there is always some delay between when a transmitting network terminal transmits a packet and when the receiving network terminal receives the packet.

In some cases, this delay is unimportant. For example, some data (e.g., most e-mail messages, etc.) is not perishable or highly time-sensitive and the sender and receiver of the data might consider it unimportant whether the packet takes 5 milliseconds, 5 seconds or even 5 minutes to traverse the network. In contrast, other data (e.g., voice, full-motion video, instant messaging, etc.) is perishable or highly time-sensitive, and, therefore, the sender and receiver of the data might consider it very important that the packets traverse the network quickly.

When packet networks were originally conceived and designed and constructed, little or no consideration was given to ensuring that a fixed number of packets could be sent across a packet network with a maximum delay. Average delays were considered, and packet networks were engineered to consider average delays, but little or no consideration was given to engineering the maximum delay. Increasingly, however, packet networks are being considered for carrying time-sensitive data for applications such as Internet telephony and television broadcasting.

Perhaps the most significant source of delay in a packet network is due to the speed at which the routers operate. It is well known in the prior art how to make and use fast routers, but their extra speed comes at a price, and, therefore, it is not typically economical to build them. In fact, it is well known in the prior art how to trade cost for performance when designing and building routers.

Nevertheless, the need exists for a router that is more powerful than comparatively expensive routers in the prior art.

SUMMARY OF THE INVENTION

The present invention is a router and routing table cache population technique that avoids some of the costs and disadvantages associated with techniques in the prior art. In particular, the illustrative embodiment routes packets through it more quickly than comparatively expensive routers in the prior art.

The present invention recognizes that a router with a small routing table cache can be fast if the routing table cache has a high hit ratio, and that a high hit ratio can be achieved by predicting which entries will be needed in the routing table cache in the future and by populating the routing table cache with those entries before they are needed. In accordance with the illustrative embodiment of the present invention, this is accomplished by: (i) building one or more temporal models of the occurrence of needed entries based on empirical data, (ii) by using the temporal model(s) to predict which entries are most likely to be needed at some time in the future, and (iii) by populating the router table cache with those entries before they are needed.

The illustrative embodiment of the present invention comprises: an input port for receiving a succession of packets, wherein each of the packets comprises a destination address; a plurality of output ports; a switching fabric for interconnecting the input port to each of the plurality of output ports; a processor or building a temporal model of the occurrence of the destination addresses at the input port, for populating the routing table cache based on the temporal model and at least one entry that is stored in a routing table, and for routing at least one of the packets from the input port to one of the output ports through the switching fabric based on the entry that is stored in the routing table cache.

DETAILED DESCRIPTION

Figure 1:
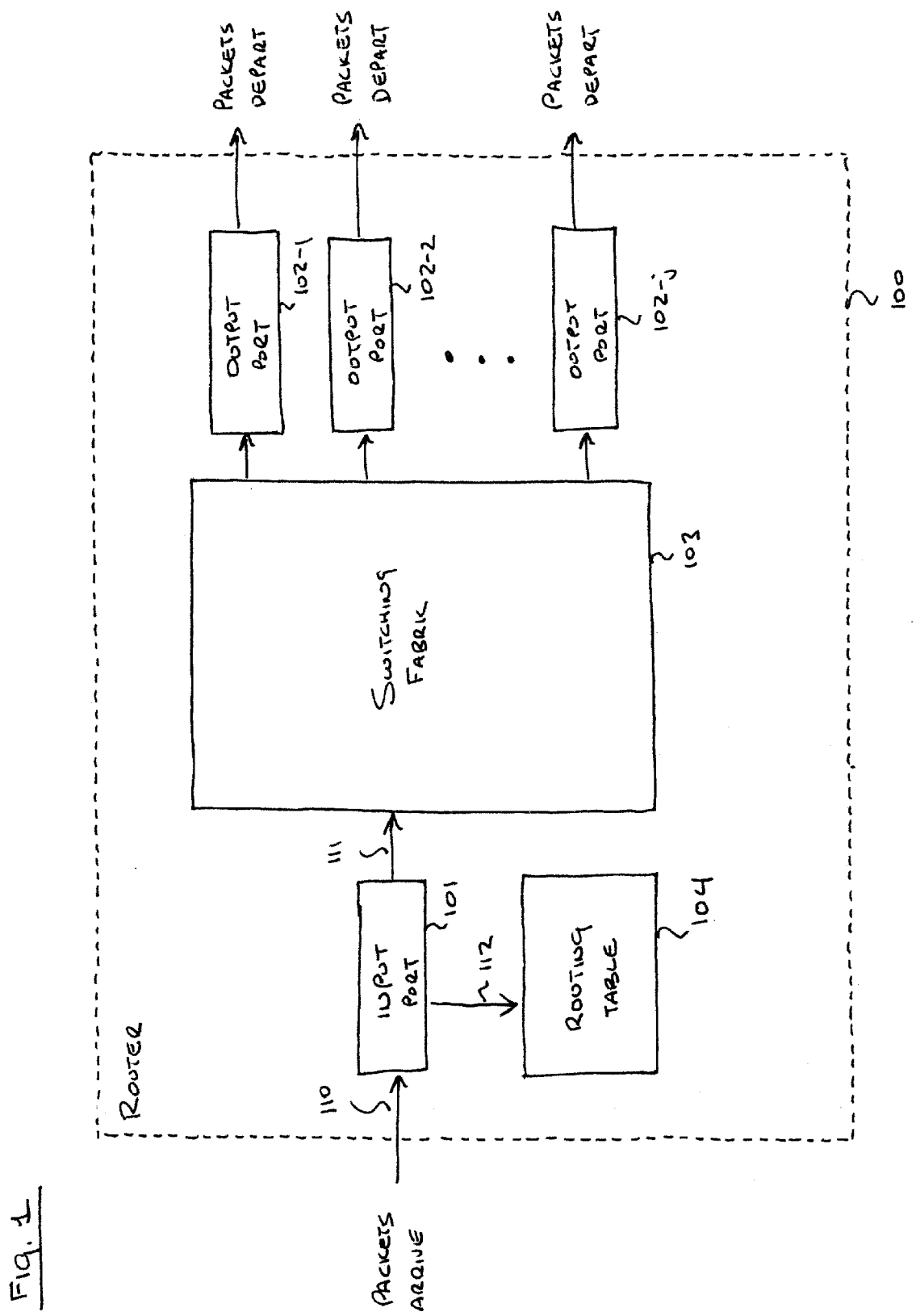
FIG. 1 depicts a block diagram of the salient components of a router in accordance with the illustrative embodiment of the present invention.

FIG. 1 depicts a block diagram of the salient components of a router in accordance with the illustrative embodiment of the present invention. Because the nomenclature of packet networking is not well standardized, a router is sometimes called a "packet switch," a "datagram switch," a "cell switch," an "ATM switch," a "gateway," a "firewall," or a "bridge" depending on the purpose for which the router is being used and on the educational and industrial background of the person using the term. However, for the purposes of this specification, a "router" is defined as a switch that is capable of receiving one or more packets, each of which comprises a destination address, and of routing each packet to an output port based on that destination address.

Router 100 comprises: input port 101, a plurality of output ports, output port 102-1 through 102-j, switching fabric 103, and router table 104, all interconnected as shown. Some embodiments of the present invention have more than one input port, and in those cases each input port works in the same manner as input port 101 and each contends with the others for access to routing table 104.

As is clear to those skilled in the art, switching fabric 103 is a space-division switch or a time-division switch or any combination of space-division switches and time-division switches (e.g., a space-time-space-division switch, etc.) that is capable of transporting a packet from input port 101 to one of output ports 102-1 through 102-$j$ under the direction of input port 101. It will be clear to those skilled in the art how to make and use switching fabric 103.

Routing table 104 is a table that contains a plurality of entries. For the purpose of this specification, an "entry" is defined as a mapping of one or more network addresses to one or more output ports of a router. When an entry maps a network address to more than one of a router's output ports, the entry might implicitly or explicitly prioritize those output ports so that, for example, if one is congested, another might be used. Table 1 depicts an illustrative portion of routing table 104 that contains five illustrative entries, wherein the destination addresses are depicted in IPv4 dotted-decimal notation. The first four illustrative entries (i.e., 110.23.43.15/102-73, 110.23.43.16/102-13, 110.23.43.17/102-44, and 110.23.43.18/102-26) are illustrative of individual network addresses. The fifth illustrative entry (i.e., 112.7.111.x/102-15) is illustrative of an entry in which more than one network address is mapped to one of a router's output ports. It will be clear to those skilled in the art how to make and use embodiments of the present invention with other network addresses in other formats such as IPv6.

TABLE 1

Portion of Routing Table 104

| Network Address | Output Port |
|---|---|
| . . . | . . . |
| 110.23.43.15 | 102-73 |
| 110.23.43.16 | 102-13 |
| 110.23.43.17 | 102-44 |
| 110.23.43.18 | 102-26 |
| . . . | . . . |
| 112.7.111.x | 102-15 |
| . . . | . . . |

Routing table 104 can comprise a large number of entries (e.g., thousands, millions, billions, etc.), and therefore, whether routing table 104 resides in random access memory (e.g., semiconductor memory, etc.) or not (e.g., hard disk, etc.), the shear number of entries in routing table 104 can cause the process of looking up a needed entry to be slow regardless of the data structure employed for storing the entries. Furthermore, when an embodiment of the present invention comprises more than one input port, the contention among the input ports can exacerbate the average latency associated with the process of looking up a needed entry in routing table 104. It will be clear to those skilled in the art how to make and use routing table 104.

Output ports 102-1 through 102-$j$ comprises the interface circuitry for receiving packets from switching fabric 103 and for transmitting the departing packets on the appropriate output. It will be clear to those skilled in the art how to make and use output ports 102-1 through 102-$j$.

Figure 2:
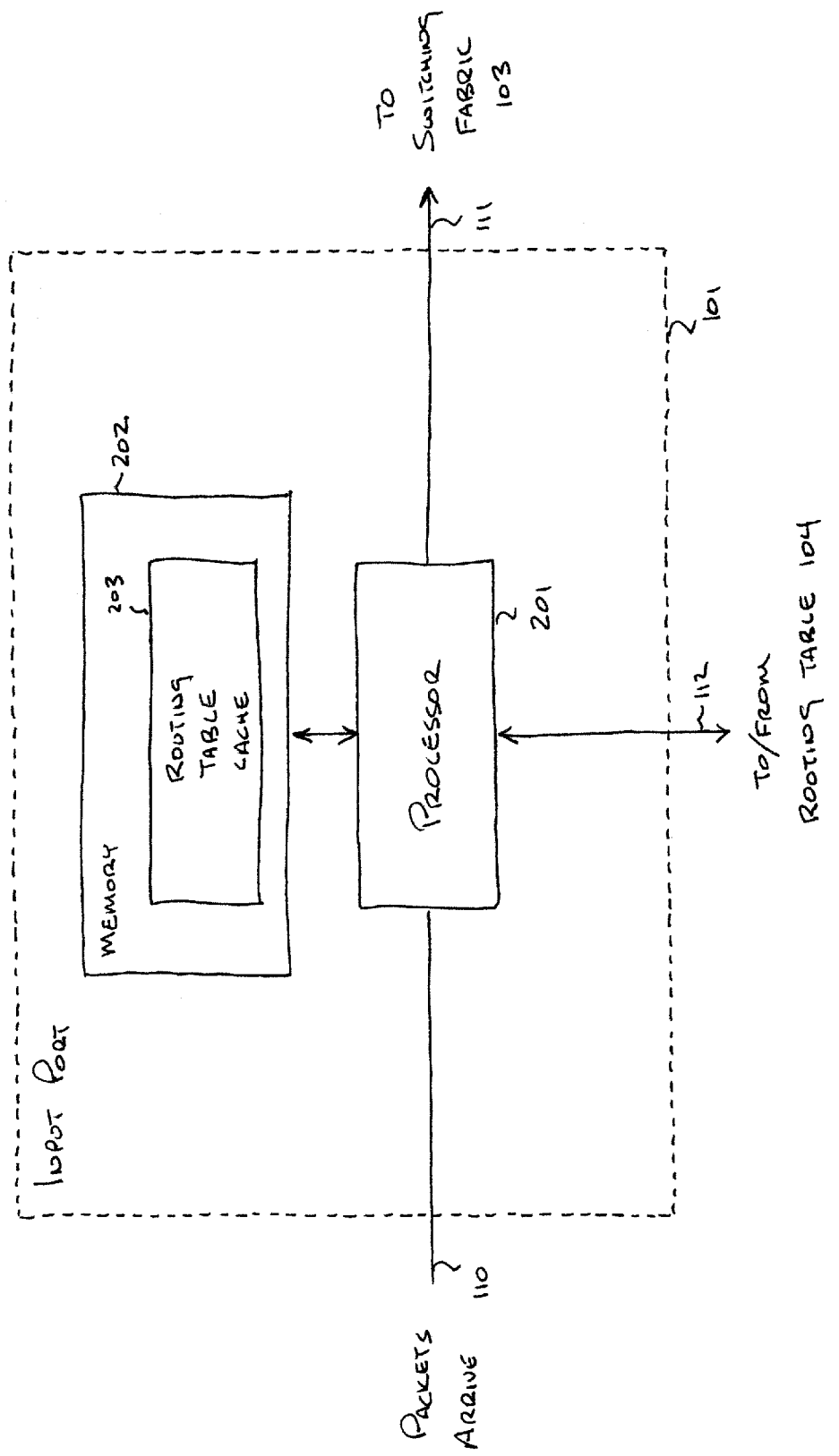
FIG. 2 depicts a block diagram of the salient components of input port 101, which is a component of the router in FIG. 1.

FIG. 2 depicts a block diagram of the salient components of input port 101, which comprises: processor 201 and memory 202, which itself comprises routing table cache 203. Processor 201 is a special-purpose processor or a general-purpose processor whose instructions are stored in memory 202 or a combination of the two. Memory 202 is advantageously a small, fast semiconductor memory that holds the instructions and data for processor 201.

To ameliorate the latency associated with looking up routing information in routing table 104, input port 101 advantageously comprises routing table cache 203. Routing table cache 203 is a cache memory that advantageously holds the most frequently accessed entries of routing table 104. Table 2 depicts an illustrative portion of routing table cache 203.

TABLE 2

Portion of Routing Table Cache 203

| Network Address | Output Port |
|---|---|
| . . . | . . . |
| 110.23.43.15 | 102-73 |
| 110.23.43.18 | 102-26 |
| . . . | . . . |

Typically, it is faster for processor 201 to retrieve an entry from routing table cache 203 than it is for processor 201 to retrieve the same entry from routing table 104 for three reasons. First, because routing table cache 203 is smaller than routing table 104, routing table cache 203 is typically stored in a physically faster memory than is routing table 104 (e.g., semiconductor RAM vs. hard disk, etc.). Second, processor 201 does not have to contend with other processors for access to routing table cache 203, whereas processor 201 would have to contend for access to routing table 104 when router 100 comprises a plurality of input ports. And third, because the number of entries in routing table cache 203 is typically orders of magnitude smaller than the number of entries in routing table 104, the process of searching through routing table cache 203 for a needed entry is typically much smaller than is the process of searching through routing table 104 for the same entry, regardless of the data structure employed.

It will be clear to those skilled in the art how to decide how many entries routing table cache 203 should contain. In deciding this number, there are two factors that are advantageously considered.

Figure 3:
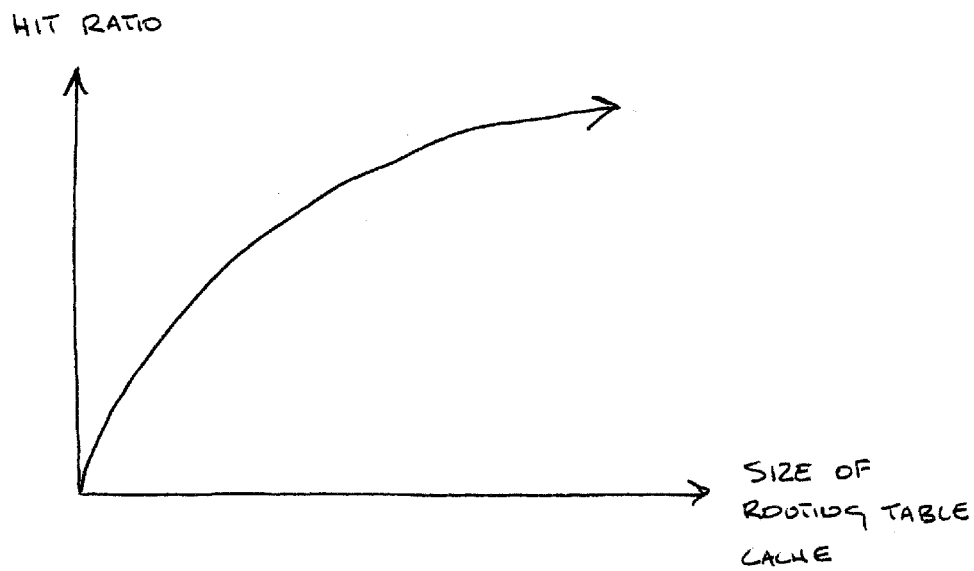
FIG. 3 is a graph that depicts the relationship of the hit ratio of routing table cache 203 as a function of the number of entries in routing table cache 203.

First, as shown in FIG. 3, as the number of entries in routing table cache 203 increases, the hit ratio also increases, albeit with diminishing returns. This suggests that router 100 can be made faster by increasing the number of entries in routing table cache 203. For the purposes of this specification, the phrase "hit ratio" is defined as the ratio of the number of entries that processor 201 finds in routing table cache 203 divided by the total number of entries that processor 201 needs.

Figure 4:
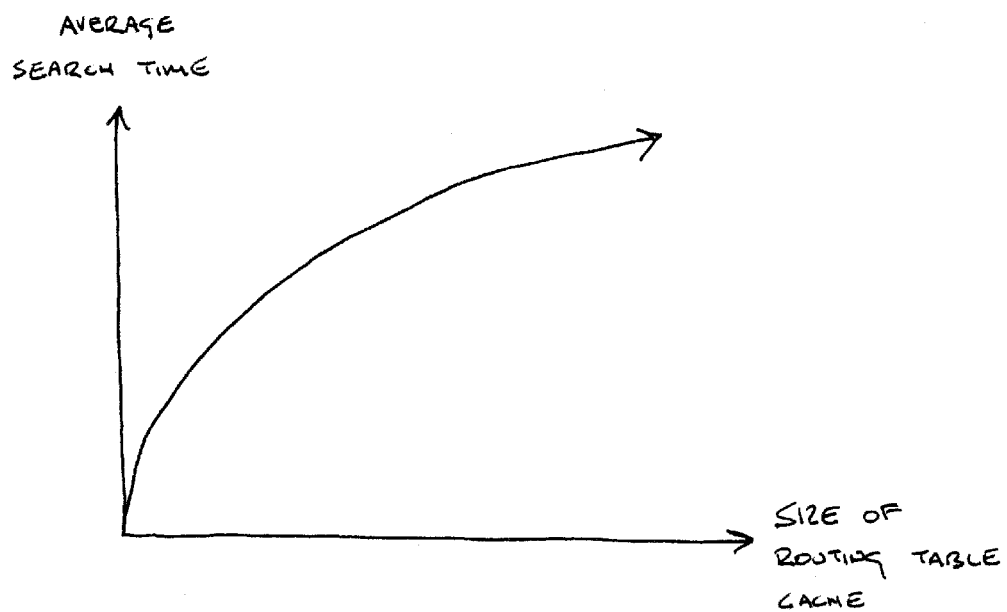
FIG. 4 is a graph that depicts the relationship of the average search time for routing table cache 203 as a function of the number of entries in routing table cache 203.

Second, as shown in FIG. 4, as the number of entries in routing table cache 203 increases, the time it takes processor 201 to search through routing table cache 203 to find a needed entry also increases. This suggests that router 100 can be made faster by decreasing the number of entries in routing table cache 203.

Although these two factors might seem to cancel each other, in general, the speed of router 100 is improved by having a small cache that is populated so as to have as high a hit ratio as possible.

The illustrative embodiment of the present invention seeks to have a high hit ratio by proactively populating routing table cache 203. In particular, the illustrative embodiment populates routing table cache 203 by: (i) building a temporal model of the occurrence of needed entries based on empirical data, (ii) by using the temporal model to predict which entries are most likely to be needed at some time in the future, and (iii) by populating router table cache 203 with those entries before they are needed. This is in contrast to routing table cache population techniques in the prior art that are either: (i) random, or (ii) reactive.

A brief discussion of how router 100 would be populated in accordance with some routing table cache population techniques in the prior art will facilitate an understanding of how it is populated in accordance with the illustrative embodiment and will also assist in understanding the difference between the prior art and the illustrative embodiment.

One routing table cache population technique in the prior art is the "random population technique." In accordance with the random population technique, routing table cache 203 would be populated with entries from routing table 104 that were selected at random. In other words, if routing table 104 contained n entries, the probability that routing table cache 203 would be populated with any given entry would be 1/n. Furthermore, in accordance with the random population technique, once routing table cache 203 was populated, its contents would not be changed in response to empirical data on which entries were actually needed. The advantage of the random population technique is that it requires little processing overhead, but the disadvantage is that it has a very low hit ratio—so low, in fact, that the random population technique is not much better than, and is possibly worse than, having no routing table cache at all.

Another routing table cache population technique in the prior art is the "random replacement technique." In accordance with this technique, routing table cache 203 would be initially populated with entries from routing table 104 that were selected at random. Thereafter, when processor 201 accessed a particular entry in routing table cache 203 (i.e., a cache hit), processor 201 would do nothing to routing table cache 203, but when processor 201 did not find a needed entry in routing table cache 203 (i.e., a cache fault) and had to resort to routing table 104 for the entry, processor 201 would randomly replace an entry in routing table cache 203 with the entry just retrieved from routing table 104. The theory underlying this technique is based on the recognition that an entry that has been needed once is more likely to be needed again than is a randomly-chosen entry, and, therefore, this technique seeks to improve the hit ratio (in comparison to the random population technique) by seeking to anticipate what entries will be needed in the future. The advantages of the random replacement technique are that it requires little processing overhead and that it usually has a higher hit ratio than the random population technique. It is disadvantageous, however, in that it does not take into consideration what entries are deleted and might delete a commonly needed entry. Furthermore, in contrast to the illustrative embodiment of the present invention, the random replacement technique is reactive, which means that it would only populate routing table cache 203 with an entry in reaction to a need for that entry. That is, it only populates routing table cache 203 with an entry after than entry has been needed, in contrast to the present invention which populates routing table cache 203 with entries before they are needed. The random replacement technique is advantageous in that it requires little processing overhead, which decreases the average delay through router 100.

A third replacement technique in the prior art is the "least-recently-used" or "LRU" technique. In accordance with the least-recently-used technique, routing table cache 203 would be initially populated with entries from routing table 104 that were selected at random. Thereafter, processor 201 would keep track of how recently each entry in routing table cache 203 was accessed. When processor 201 accesses a particular entry in routing table cache 203 (i.e., a cache hit), that entry would be marked as having been recently used, but when processor 201 did not find a needed entry in routing table cache 203 (i.e., a cache fault) and was forced to resort to routing table 104 for the entry, processor 201 would replace the least-recently-used entry in routing table cache 203 with the entry just retrieved from routing table 104. The theory underlying this technique is based on the recognition that an entry that has been recently used is more likely to be needed again than is the least-recently-used entry. The least-recently-used technique is advantageous in that it has a high hit ratio relative to all known routing table cache replacement techniques in the prior art. The least-recently-used technique is disadvantageous in that it requires that processor 201 spend a great deal of time keeping track of how recently each entry in routing table cache 203 is accessed, which increases the average delay through router 100. But like the random population technique and the random replacement technique, and in contrast to the illustrative embodiment, the least-recently-used technique is reactive.

Figure 5:
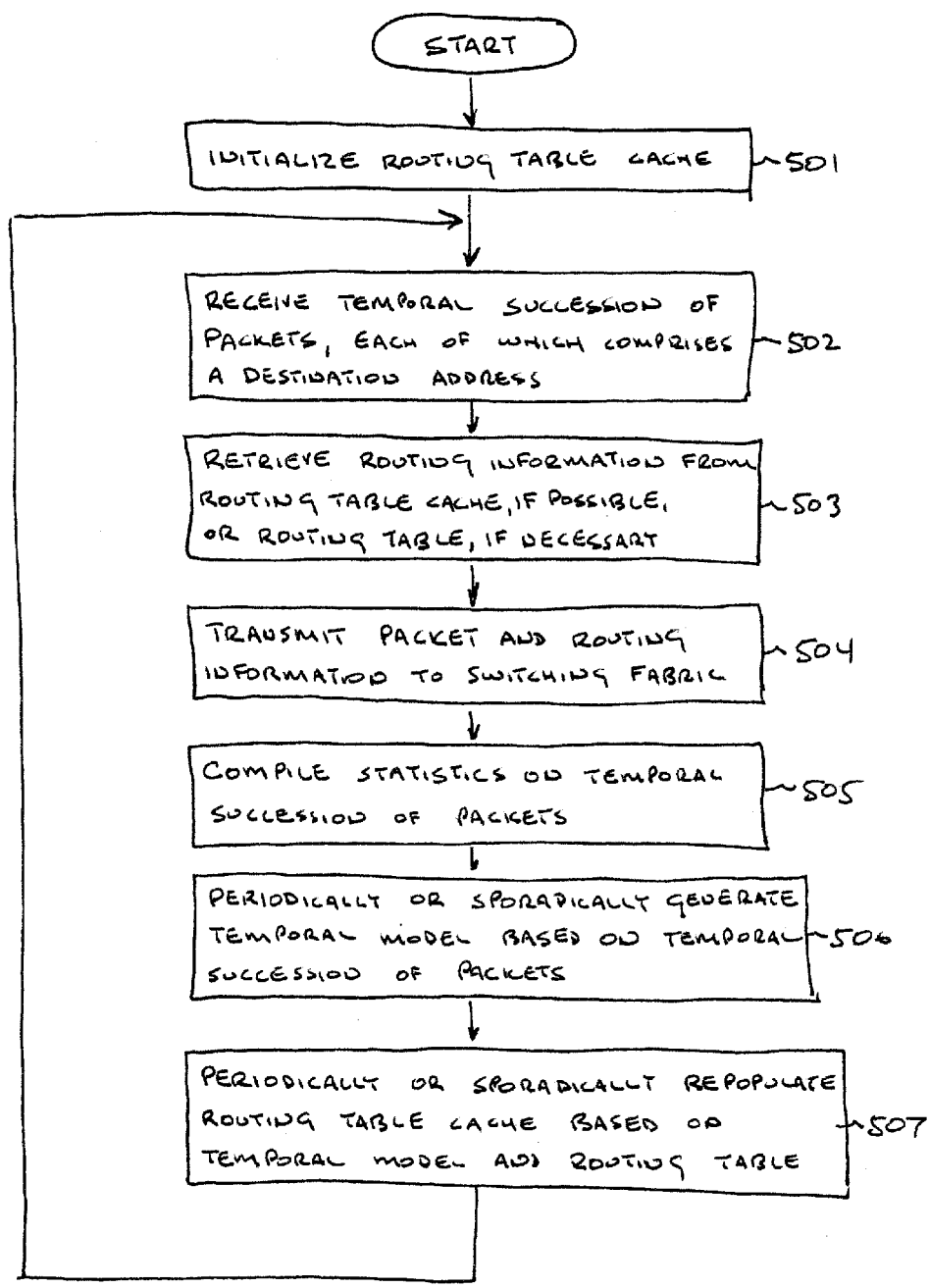
FIG. 5 depicts a flowchart of the salient steps performed by router 100 each time it receives and routes a packet.

FIG. 5 depicts a flowchart of the operation of the illustrative embodiment of the present invention, which seeks to have a high hit ratio by predictively populating routing table cache 203.

At step 501, processor 201 initially populates routing table cache 203 with entries from routing table 104 that are selected at random. It will be clear to those skilled in the art how to perform step 501.

At step 502, as input port 101 receives a temporal succession of packets, each of which comprises a destination address. As part of step 502, processor 201 examines each packet to determine the network address to which the packet is addressed. It will be clear to those skilled in the art how to perform step 502.

At step 503, processor 201 retrieves the routing information for each destination address from routing table cache 203, if possible, and from routing table 104, if necessary. For example, if the network address to which the packet is addressed is "110.23.43.18," then processor 201 only need look in routing table cache 203 to determine that the packet is to be transmitted via output port 102-6 (see Table 2). Alternatively, if the network address to which the packet is addressed is "110.23.43.17," then processor 201 cannot learn from routing table cache 203 how to direct the packet and must query routing table 104 to learn that the packet is to be transmitted via output port 102-4 (see Table 1). It will be clear to those skilled in the art how to perform step 503.

At step 504, processor 201 transmits each packet and the information on how it should be routed (i.e., the output port to which it should be routed) to switching fabric 103, which transports it to the appropriate port. It will be clear to those skilled in the art how to perform step 504.

At step 505, processor 201 continually compiles statistics on the temporal succession of packets. In particular, processor 201 advantageously counts how many times each entry is needed in a short time interval, such as 2 milliseconds, over a longer time horizon, such as 1 second. For example, processor 201 advantageously knows how many times each entry was needed in each 2 millisecond interval during the prior 1 second. Therefore, processor 201 retains a data set (i.e., 500 data points) for each destination address. Table 3 depicts an illustrative portion of the information compiled and retained in step 505.

TABLE 3

500 Data Points for Destination Addresses

| Time | ... | Address 110.23.43.17 | Address 110.23.43.18 | ... |
|---|---|---|---|---|
| t = 0 | ... | 5 | 1 | ... |
| t = −2 ms | ... | 0 | 3 | ... |
| t = −4 ms | ... | 5 | 0 | ... |
| t = −6 ms | ... | 0 | 0 | ... |
| t = −8 ms | ... | 5 | 2 | ... |
| t = −10 ms | ... | 0 | 0 | ... |
| t = −12 ms | ... | 5 | 14 | ... |
| t = −14 ms | ... | 0 | 4 | ... |
| ... | ... | ... | ... | ... |
| t = −998 ms | ... | 5 | 12 | ... |
| t = −1000 ms | ... | 0 | 5 | ... |

The purpose of step 505 is to compile data on the need for each needed entry so as to determine if patterns can be discerned that can be exploited. For example, an examination of Table 3 reveals a clear pattern of the need for the entry for network address 110.23.43.17 (i.e., it is needed in alternating 2 millisecond intervals) but no such clear pattern is immediately apparent for the entry for network address 110.23.43.18. But merely because no such pattern is immediately apparent does not mean that a real pattern does not exist, and, therefore, the illustrative embodiment employs mathematical tools to reveal the patterns.

As part of step 505, processor 201 periodically or sporadically determines the autocorrelation for each data set because it provides useful insight into the existence of temporal patterns within each data set. When the autocorrelations for each destination address are computed, a strong correlation is revealed to exist in some of the data points, which only a weak correlation is indicated in others. The utility of this difference will be revealed in step 601, which is discussed below. The illustrative embodiment computes the autocorrelation for each destination address with a lag of k=n/4=125. The autocorrelation for a data set of n data points, with lag k, is given by:

$$r_k = \frac{\sum_{t=1}^{N-k}(x_t - \bar{x})(x_{t+k} - \bar{x})}{\sum_{t=1}^{N}(x_t - \bar{x})^2} \quad \text{(Eq. 1)}$$

Figure 6:
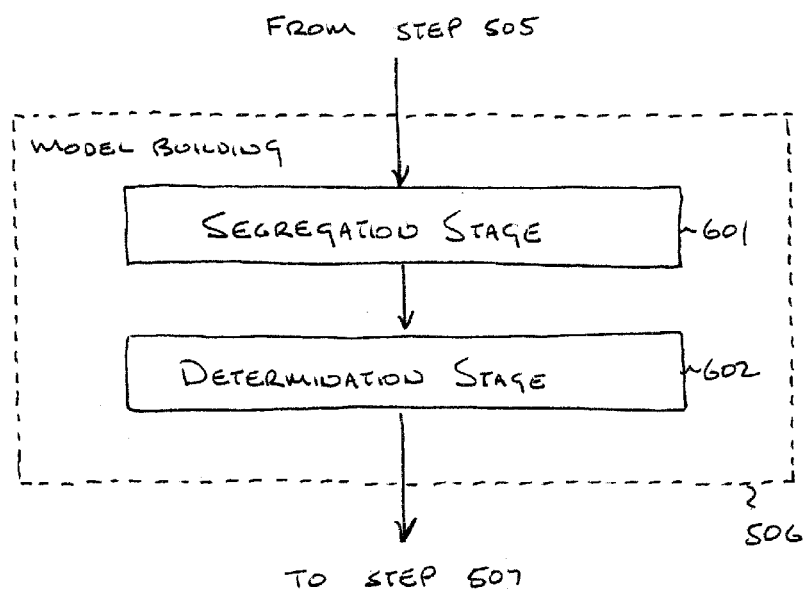
FIG. 6 depicts a flowchart of the steps involved in periodically or sporadically generating a temporal model, as depicted in FIG. 5.

At step 506, processor 201 periodically or sporadically builds a temporal model for the data set associated with each destination address. In accordance with the illustrative embodiment, and as shown in FIG. 6, the building of the temporal model comprises two stages:

1. the segregation stage, and
2. the determination stage.

At step 601, the segregation stage, the illustrative embodiment determines which of the data sets (whose autocorrelation was computed in step 505) are highly correlated and which are not. To do this, processor 201 determines a confidence band equal to $$2\left(\frac{\pm 2}{\sqrt{n}}\right),$$

where n is the number of data points (e.g., 500) in each data set. After the autocorrelation function for all lags are computed, then the mean of the autocorrelation functions is also computed. If the mean for a data set is greater than or equal to the confidence band, the illustrative embodiment considers that data set to be highly correlated; otherwise it considers it to be not highly correlated.

At step 602, the determination stage, the illustrative embodiment selects a temporal model structure for each data set associated with each destination address. In other words, the illustrative embodiment seeks to select the temporal model structure for each data set that best predicts the future occurrence of the destination address associated with the data set. In accordance with the illustrative embodiment of the present invention, processor 201 builds one temporal model based on the highly correlated data sets to predict the occurrence of all destination addresses whose data sets are highly correlated and builds one temporal model based on the not-highly correlated data sets to predict the occurrence of all destination addresses whose data sets are not-highly correlated.

For the highly correlated data sets, the illustrative embodiment uses the autoregressive moving-average model (1, 2) structure $$W_t = \Phi_1 w_{t-1} - \Theta_1 a_{t-1} - \Theta_2 a_{t-2} + a_t \quad \text{(Eq. 2)}$$

and for the not highly correlated data sets, the illustrative embodiment uses the autoregressive moving-average model (1, 3) structure $$W_t = \Phi_1 w_{t-1} - \Theta_1 a_{t-1} - \Theta_2 a_{t-2} - \Theta_3 a_{t-3} + a_t \quad \text{(Eq. 3)}$$

where $W_t$ is the value of the data point in a series after subtracting the mean of the series, $\Phi$ is the autoregressive parameter, which describes the effect of unit change in $W_{t-1}$ on $W_t$, $\Theta$ is the moving average parameter, the number (2 or 3) refers to the number of moving average parameters, and $a_t$ is the white noise error.

It will be clear to those skilled in the art, however, that in alternative embodiments of the present invention other temporal model structures can be used. For example, one temporal model structure can be used for all of the data sets which obviates the necessity for computing autocorrelation of each data set and of categorizing each data set based on its correlation value. Furthermore, it will be clear to those skilled in the art how to categorize each data set into two or more categories and to select different temporal model structures for each category. And still furthermore, it will be clear to those skilled in the art how to choose different temporal model structures than those shown above.

Next, processor 201 builds a temporal model for each of a randomly selected number (e.g., 10 to 20) of destination addresses that have highly correlated data sets and for each of a randomly selected number (e.g., 10 to 20) of destination addresses that do not have highly correlated data sets. The reason that only a few models are built is because can be too computationally burdensome for processor 201 to build a different temporal model for each data set, and at least one of the temporal models that are built are likely to provide an acceptable model for the other data sets. In alternative embodiments of the present invention, processor 201 builds a unique temporal model for each data set. It will be clear to those skilled in the art how to determine the number of models built given the computational resources available.

Next, processor 201 selects one temporal model from the dozen or so that were built in step 602 to use with all of the data sets that are highly correlated and one temporal model from the dozen or so that were built in step 602 to use with all of the data sets that are not highly correlated. To chose the best model for each group of data sets, the illustrative embodiment advantageously uses the mean absolute error (MAE). This is done by determining which model does the best job of predicting the occurrence of not only its own future addresses, but also the best job of predicting the occurrence of the future addresses of the other addresses for which models were built in step 602. The best model is the one that in general has the lower values of mean absolute error for the data of the other addresses.

At the end of step 506, one temporal model is advantageously selected for predicting the occurrence of addresses associated with highly correlated data sets and a second temporal model is advantageously selected for predicting the occurrence of addresses associated with not highly correlated data sets.

At step 507, processor 201 periodically or sporadically repopulates routing table cache 203 based on the temporal models built in step 506 and on the entries in routing table 104. To accomplish this, processor 201 advantageously uses the model for the highly correlated data sets to predict the number of occurrences of each destination address in the next time interval (i.e., 2 milliseconds). If the model predicts that the destination address will be needed in the next time interval, processor 201 retrieves the entry for that destination address from routing table 104 and populates routing table cache 203 with that entry. If the model does not predict the occurrence of that destination address in the next time interval, then processor 201 does nothing.

If, after processor 201 has predicted the occurrence of each destination address associated with the highly correlated data, there is space in routing table cache 203 processor 201 next uses the model for the not highly correlated data sets to predict the number of occurrences of each destination address in the next time interval (i.e., 2 milliseconds). If the model predicts that the destination address will be needed in the next time interval, processor 201 retrieves the entry for that destination address from routing table 104 and populates routing table cache 203 with that entry. If the model does not predict the occurrence of that destination address in the next time interval, then processor 201 does nothing. The reason processor 201 populates routing table cache 203 with the highly correlated data first is because if there isn't room in routing table cache 203 for both the highly correlated data and the not highly correlated data, the highly correlated data sets should have priority.

To ameliorate interruptions, routing table cache 203 should comprises two portions, one of which is active and being used for routing packets and the other which is inactive and being populated in accordance with step 507. This enables the predicted entries to be populated in the inactive portion and to switch that portion to active at the appropriate time.

After step 507, control returns to step 502.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A router comprising:

an input port for receiving a succession of packets, wherein each of said packets comprises a destination address;

a plurality of output ports;

a switching fabric for interconnecting said input port to each of said plurality of output ports; and a processor for building a temporal model of the occurrence of said destination addresses at said input port, for populating said routing table cache based on said temporal model and at least one entry that is stored in a routing table, and for routing at least one of said packets from said input port to one of said output ports through said switching fabric based on said entry that is stored in said routing table cache;

wherein said temporal model is based on the autoregressive moving average of the occurrence of said destination addresses.

2. A method comprising:

receiving a temporal succession of packets at an input port, wherein each of said packets comprises a destination address;

generating a temporal model based on the occurrence of said destination addresses;

populating a routing table cache based on said temporal model and at least one entry that is stored in a routing table; and forwarding at least one of said packets from said input port to one of a plurality of output ports based on said entry that is stored in said routing table cache;

wherein said temporal model is based on the autoregressive moving average of the occurrence of said destination addresses.

* * * * *

US006816457C1

(12) INTER PARTES REEXAMINATION CERTIFICATE (798th)
United States Patent
Bahattab

(10) Number: US 6,816,457 C1
(45) Certificate Issued: Jan. 15, 2014

(54) PREDICTIVE ROUTING TABLE CACHE POPULATION

(76) Inventor: Abdullah Ali Bahattab, Chicago, IL (US)

Reexamination Request:
No. 95/000,500, Aug. 28, 2009

Reexamination Certificate for:
Patent No.: 6,816,457
Issued: Nov. 9, 2004
Appl. No.: 09/633,754
Filed: Aug. 7, 2000

Related U.S. Application Data

(60) Provisional application No. 60/208,888, filed on Jun. 2, 2000.

(51) Int. Cl.
*H04L 12/56* (2011.01)

(52) U.S. Cl.
USPC .......................................... 370/232; 370/234

(58) Field of Classification Search
None
See application file for complete search history.

(56) References Cited

To view the complete listing of prior art documents cited during the proceeding for Reexamination Control Number 95/000,500, please refer to the USPTO's public Patent Application Information Retrieval (PAIR) system under the Display References tab.

*Primary Examiner* — Scott L. Weaver

(57) ABSTRACT

A router and method for routing table cache population technique is disclosed. In particular, the illustrative embodiment routes packets through it more quickly than comparatively expensive routers in the prior art. The present invention recognizes that a fast router has small routing table cache that has a high hit ratio and that a high hit ratio can be achieved with a small routing table cache by predicting which entries will be needed in the routing table cache in the future and by populating the routing table cache with those entries before they are needed. The illustrative embodiment of the present invention comprises: an input port for receiving a succession of packets, wherein each of the packets comprises a destination address; a plurality of output ports; a switching fabric for interconnecting the input port to each of the plurality of output ports; a processor or building a temporal model of the occurrence of the destination addresses at the input port, for populating the routing table cache based on the temporal model and at least one entry that is stored in a routing table, and for routing at least one of the packets from the input port to one of the output ports through the switching fabric based on the entry that is stored in the routing table cache.

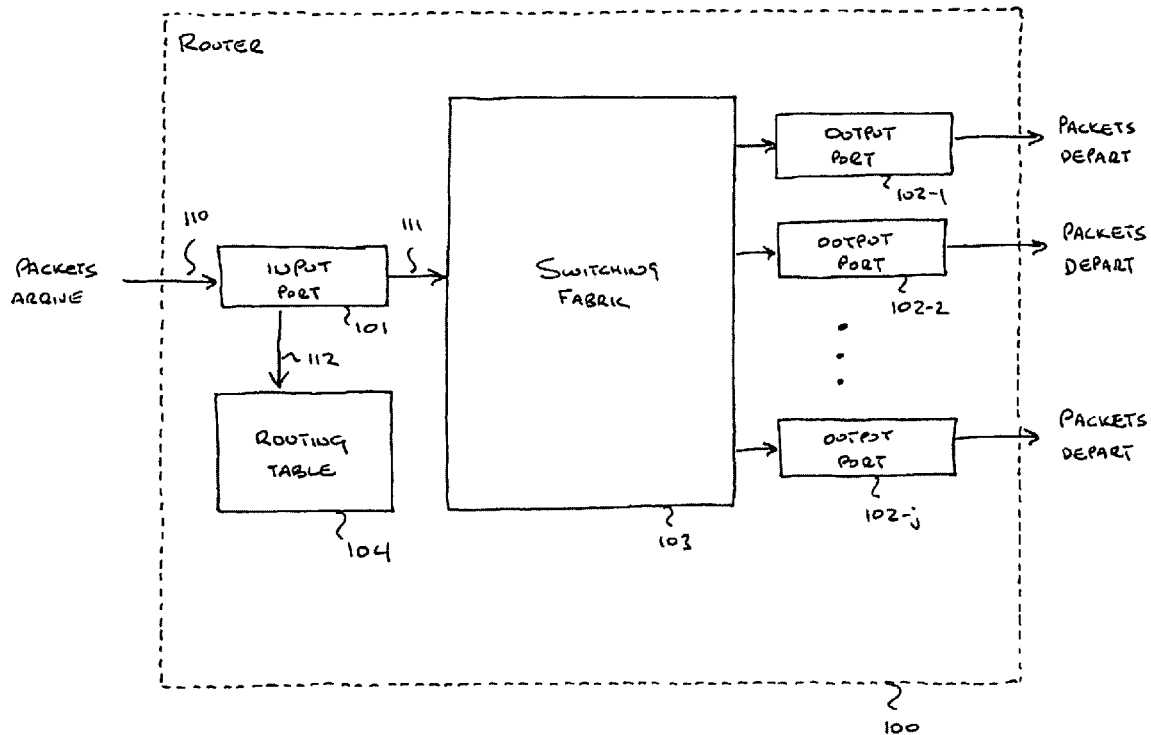

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

\* \* \* \* \*